United States Patent [19]

Holmes

[11] 4,135,223

[45] Jan. 16, 1979

[54] ELECTRONIC PROTECTION CIRCUIT

[75] Inventor: Kenneth P. Holmes, Austin, Tex.

[73] Assignee: Esquire, Inc., New York, N.Y.

[21] Appl. No.: 803,365

[22] Filed: Jun. 3, 1977

[51] Int. Cl.² ............................................. H02H 3/20
[52] U.S. Cl. ........................................ 361/56; 361/91; 361/55
[58] Field of Search ................... 361/54, 55, 56, 91, 361/111, 86; 323/21

[56] References Cited

U.S. PATENT DOCUMENTS

| | | | |
|---|---|---|---|
| 3,353,066 | 11/1967 | De Souza | 361/55 |
| 3,553,530 | 1/1971 | Gregson | 361/56 |
| 3,614,531 | 10/1971 | Oswald | 361/56 |
| 3,729,651 | 4/1973 | Fricker et al. | 361/56 |
| 3,816,809 | 6/1974 | Kuster | 361/91 |

*Primary Examiner*—Gerald Goldberg
*Attorney, Agent, or Firm*—Frank S. Vaden III

[57] ABSTRACT

A protection circuit for producing one or more triggers in the presence of a monitored overvoltage condition employing photodiode networks for sensing the voltage overload, phototransistors responding to the photodiode outputs and operating gated semiconductors, which, in turn, discharge capacitors for trigger production. Separate networks are provided for each ac polarity operation. Monitoring may be with respect to supply voltage, power supply output voltage or one or more independent voltages.

14 Claims, 2 Drawing Figures

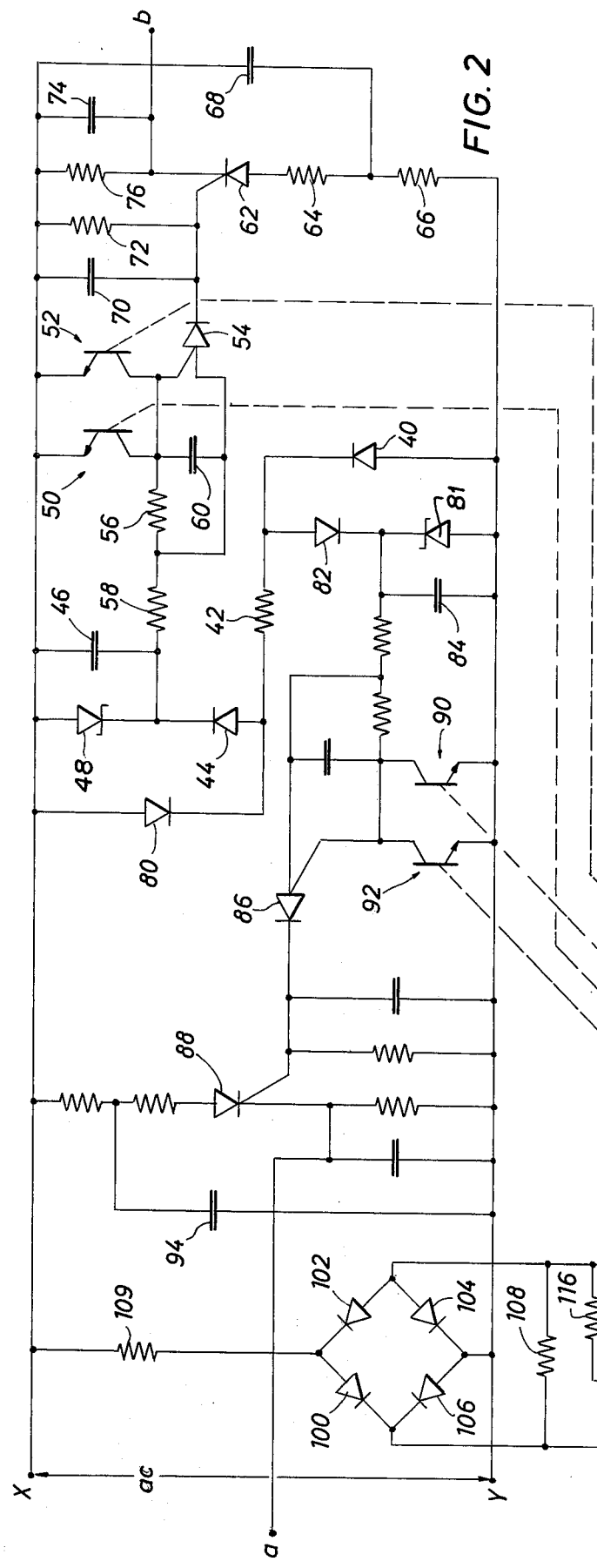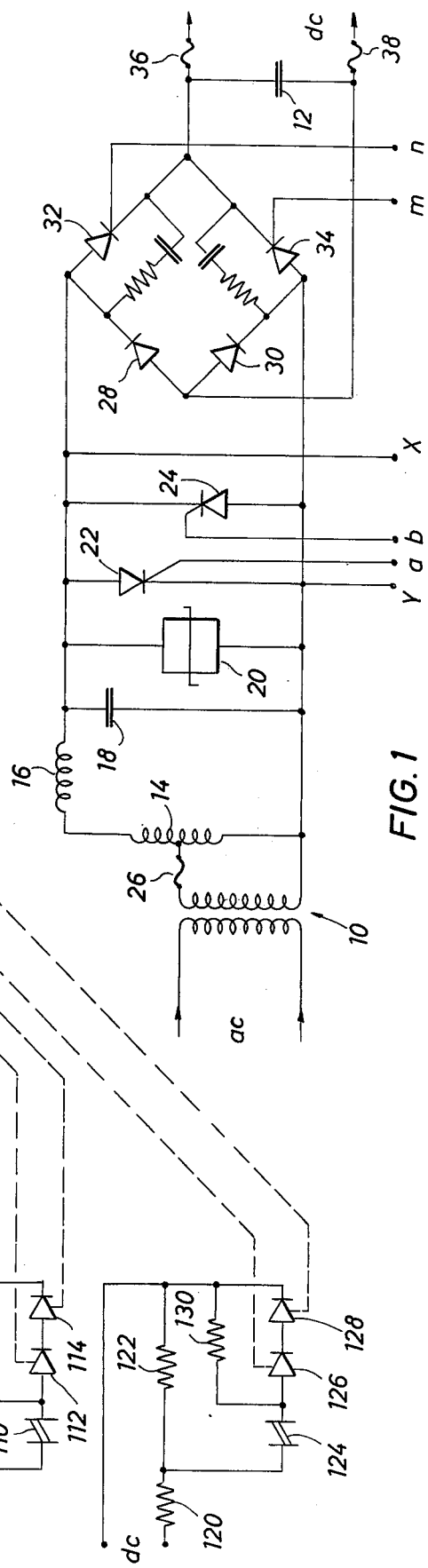

ELECTRONIC PROTECTION CIRCUIT

BACKGROUND OF THE INVENTION

1. Field of the Invention

This invention relates to emergency protection circuits operating in conjunction with a normally stable power supply and more particularly, protection circuits of normally stable power supplies that operate in conjunction with a system of high intensity, gaseous-discharge lamps and therfore susceptible to injury from a supply voltage exceeding even a momentary voltage level beyond a certain limit.

2. Description of the Prior Art

There are many fuses, circuit breakers and the like that operate in the presence of a voltage overload to open an incoming supply source from injuring a delicate electrical device and/or electrical circuit. These protection devices are satisfactory when protecting devices and circuit components which themselves are capable of tolerating, at least for a short period of time, a circuit overload condition without appreciable injury, such as might be caused by the application of high voltage and attendent high current caused by a short circuit.

There are, however, circuits and devices that are incapable of tolerating even a momentary overload condition and, therefore, such protection devices and/or circuits are not satisfactory in preventing injury from occurring. There are many other installations where, although the protected devices or components can tolerate a bit of overvoltage, their life or subsequent performance is impaired to some extent when subjected to a momentary surge. That is, a surge may not cause their failure, but will degrade their vitality.

One situation that can cause an unexpected surge to occur is one involving electrical storage devices, such as capacitors and inductors, that can discharge or untimely cause a current or voltage to occur back into a power supply network, thereby causing related devices connected to the power supply to experience overvoltage or overcurrent conditions even through the source or supply voltage remains within limits. A circuit which is suitable for providing some protection under such conditions is disclosed in FIG. 7 and related illustrations of copending patent application Ser. No. 654,926, filed Feb. 2, 1976, by the same inventor. A phototransistor controlled by the brightness of a light emitting diode connected across the dc output of the power supply determines the application of gate voltage to a triac. This conduction timing "regulates" the output even though there is no regulation of the ac input to the power supply. The circuit is protected against surges of ac input by the gating of another triac that operates a coil connected for opening its contacts in series with the source line.

Although the circuit does open the line in the presence of sustained overvoltage input conditions, its operation is somewhat hesitant when the voltage conditions are borderline. Further, the dc timing connection does provide regulation in the case of a dc voltage output above a predetermined danger level, but the action does not ensure that a sudden surge will result in opening the power circuit. That is, there is no absolute protection provided.

Therefore, it is a feature of the present invention to provide an improved electronic protection circuit for monitoring either or both ac and dc voltage conditions and providing a positive output for disconnecting a power circuit in the presence of a detected overload, even a borderline detected overload.

It is another feature of the present invention to provide an improved electronic protection circuit operating in the above manner in connection with photodiodes controlling the conduction of phototransistors, which, upon conduction, discharge previously stored charges for producing a large overvoltage signal to the power supply disconnect network.

SUMMARY OF THE INVENTION

The embodiment of the present invention disclosed herein is an electronic protection circuit which monitors independently an ac voltage, preferably the source voltage to the power supply, and a dc voltage, preferably the output voltage from the power supply, which is connected to operate a load system capable of influencing the dc voltage output condition of the power supply. The monitoring systems each include two photodiodes, the brightness of the light emittance therefrom controlling the conduction of separate phototransistors in separate electronic storage-and-discharge network connected to produce an output when the respective monitored voltage exceeds a predetermined level. One storage-and-discharge network operates in conjunction with the positive polarity of an applied ac voltage and a second storage-and-discharge network operates in conjunction with the negative polarity. Phototransistor conduction causes the conduction of a gated semiconductor and, hence, the discharge of a capacitor to enhance and make certain that the output is a strong voltage trigger applied to the power disconnect network without hesitancy.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a typical embodiment of the invention and are therefore not to be considered limiting of its scope, for the invention may admit to other equally effective embodiments.

In the Drawings:

FIG. 1 is a schematic diagram of a power supply operable in conjunction with triggers from the protection circuit of the preferred embodiment thereof shown in FIG. 2; and FIG. 2 is a schematic diagram of a preferred embodiment of a protection circuit in accordance with the present invention.

DESCRIPTION OF ILLUSTRATED EMBODIMENT

Now referring to the drawings and first to FIG. 1, the power section of a power supply capable of being protected by the protection device to be hereinafter described, is illustrated.

Basically the circuit converts an ac source voltage applied across the input isolation transformer 10 to a desirable dc voltage applied at the output across output capacitor 12.

The input voltage level is transformed in transformer 10 and further boosted in tapped transformer 14 before passing through the filter section comprising inductor 16, capacitor 18 and varistor 20. These components are included to remove transients that may be present in the applied ac source voltage.

Back-to-back SCR's 22 and 24 are connected across the ac line of the power supply, the cathode of SCR 22 being applied to the line marked "Y" and the cathode of SCR 24 being connected to the line marked "X". The gate of SCR 22 is connected to terminal "a" and the gate of SCR 24 is connected to terminal "b" for external triggering in a manner to be hereinafter described. It may be seen, however, that the application of a trigger signal to an SCR effectively shorts together lines X and Y and thereby provides an overload current for the overload protection device, sometimes referred to as an overload cut out device or fuse 26, located in the line to the centertap of transformer 14.

A rectifier in the form of a bridge circuit is connected to lines X and Y, the basic bridge comprising back-to-back diodes 28 and 30 connected across lines X and Y and back-to-back SCR's 32 and 34 connected front to front across lines X and Y. The output from the bridge circuit is then taken from the common connection of the diodes and the common connections of the SCR's. It may be also noted that the SCR's are each connected in parallel with a series combination of a resistor and a capacitor to provide snubber operation. The gates of SCR 32 and the gate of SCR 34 are connected respectively to terminal m and n. These connections provide for the phase operation of the SCR as controlled by an external circuit. Such phase control is convenient for varying the dc output of the overall circuit for application to a load desirably connected to receive such treatment. Such a load might be a lamp drive circuit. The output is protected by fuses 36 and 38.

It may be noted that although a complex bridge circuit is shown in the preferred illustrated embodiment, other rectifiers including bridge circuits, such as a conventional bridge circuit comprising four diodes, may be employed in alternate power section embodiments.

Now referring to the circuit illustrated in FIG. 2, a protection circuit is shown for applying a trigger pulse to either terminal a or b in the presence of a sensed overload condition. It may be noted, the circuit is connected, as illustrated, for sensing a predetermined level across terminals X and Y of the circuit shown in FIG. 1. An applied ac source voltage of a first polarity applied to terminal Y causes a build up of voltage through diode 40, across resistor 42 and through diode 44, the charge being stored on capacitor 46 as determined by Zener diode 48.

Phototransistors 50 and 52 are connected between line X and the gate of a programmable unijunction transistor (PUT) 54. The collectors of phototransistors 50 and 52 are connected to resistor 56, one part of a resistor divider with resistor 58 connected to capacitor 46. The junction of the divider is connected to the anode of PUT 54 and capacitor 60, which isolates the gate from the anode of the PUT.

It may be seen that when either phototransistor 50 or 52 conducts, a gate voltage is supplied to PUT 54 for causing it to conduct and therefore discharging the charge built up on capacitor 46. The cathode of PUT 54 is connected to the gate of SCR 62. The cathode of SCR 62 is connected to terminal b and the anode is connected to resistor 64, a portion of a voltage divider with resistor 66. The junction of the voltage divider is connected to capacitor 68, a storage device connected to line X.

Resistor 66 is connected back to line Y. The cathode of PUT 54 is connected to capacitor 70 and resistor 72 to provide noise immunity and the cathode of SCR 62 is connected to capacitor 74 and resistor 76 for the same purpose.

It may be seen that with the application of a gate voltage to SCR 62 by PUT 54, the charge on capacitor 68 is allowed to discharge through the SCR to terminal b. Further, the gate trigger applied by PUT 54 further progresses through the terminals of SCR 62 to also be supplied to terminal b. It is this overall trigger which is applied to terminal b of the power supply section shown in FIG. 1.

In similar fashion, the opposite polarity of the AC voltage applied across terminals X and Y builds up a charge through diodes 80 and 82 to capacitor 84 as determined by zener diode 81. Discharge of capacitor 84 is through PUT 86 and SCR 88 with the conduction of phototransistor 90 or 92. With the conduction of SCR 88 capacitor 94 is discharged to add to the trigger signal applied to terminal a. It is this trigger signal which is applied to terminal a of the power section illustrated in FIG. 1.

It may be also noted that the ac voltage across terminals X and Y is also applied to a rectifier bridge comprising diodes 100, 102, 104 and 106. This is a full-wave rectifier the output of which is applied across load resistor 108, connected in parallel with the series combination of SBS 110, photodiode 112 and photodiode 114. Actually, it may be observed that resistor 108 is a voltage divider with resistor 109 connected between line X and the junction of diodes 100 and 102 of the rectifier. Bleeder resistor 116 is connected across the series combination of photodiodes 112 and 114. SBS 110 is a break-over device having about ¼ of a microsecond response time. Photodiode 112 is connected to phototransistor 92 and photodiode 114 is connected to phototransistor 50.

In response to the sensing circuit just described, an output of either polarity will result in a rectified output, causing the breakdown of SBS 110 and causing photodiodes 112 and 114 to cause conduction of phototransistors 92 and 50, respectively. Depending upon which of capacitors 46 and 84 is currently with a charge, an output will result on either terminal b or terminal a. If both polarities of the sensed voltage across terminals X and Y are above a predetermined level, then both terminals b and a will receive an output trigger. As previously noted these outputs trigger the gates on SCR's 22 and 24 to cause opening of overload current device 26 in the power section of the power supply.

The protection circuit shown in FIG. 2 may also detect for the presence of a dc voltage exceeding a predetermined level. The monitored dc voltage is applied across the voltage divider comprising resistors 120 and 122, resistors 122 being connected in parallel with SBS 124, photodiode 126 and photodiode 128. Bleeder resistor 130 is connected across photodiodes 126 and 128. Photodiode 126 is connected to operate in conjunction with phototransistor 90 and photodiode 128 is connected to operate in conjunction with phototransistor 52. Hence, when a dc voltage above the predetermined level set by the circuit is exceeded, SBS 124 conducts, causing diodes 126 and 128 to cause conduction of phototransistors 90 and 52. This results in a trigger being applied to terminal a and b, provided there has been a charge built up on capacitors 84 and 46, respectively.

It may be desirable to monitor the dc output of the circuit shown in FIG. 1 as that voltage applied to the dc terminals to be monitored in the circuit shown in FIG. 2. For example, the turn-on time of SCR's 32 and 34 as determined by the signals applied to terminals m and n, respectively, may be such as to cause a dc voltage output exceeding the desirable operating level independently of whether or not an applied ac voltage to the overall circuit has been exceeded.

It may also be noted that the ac voltage causing the build up on capacitors 46 and 84 may be independent of the voltage which is sensed by SBS 110 following rectification, if desired. Conveniently, however, this is the same ac voltage which is applied to terminals X and Y of FIG. 1.

While a particular embodiment of the invention has been shown and described, it will be understood that the invention is not limited thereto, since modification may be made and will become apparent to those skilled in the art. For example, the circuit has been described in conjunction with sensing an amplitude level exceeding a predetermined amount. It may be used to monitor a rate of change exceeding a predetermined amount, such as a condition which has not yet reached a large amplitude but is too rapidly approaching one. Such a simplified circuit may employ cathode-to-cathode connected Zener diodes, the anodes of which are connected across a capacitor. A rapid rate of change will then create a very high amplitude exceeding the predetermined sensing level for the circuit shown in FIG. 2, while a normally changing rate of change will not create such a high amplitude voltage to occur.

What is claimed is:

1. An electronic protection circuit for providing a trigger to a circuit to be protected in the presence of a source voltage exceeding a predetermined amplitude, comprising
    charge storage means responsive to storing a charge from a first polarity of an applied ac voltage,
    photoswitch means responsive to said source voltage exceeding the predetermined level, and
    a gated semiconductor connected to said charge storage means and to said photoswitch means such that when said gated semiconductor is gated on, the charge stored on said charge storage means is applied as the outgoing trigger.

2. An electronic protection circuit in accordance with claim 1, and including
    an auxiliary charge storage means responsive to storing a charge, and
    a second gated semiconductor connected thereto and to said first named gated semiconductor, the output from said first named gated semiconductor gating on said second gated semiconductor so as to discharge said auxiliary charge storage means to add to the outgoing trigger.

3. An electronic protection circuit in accordance with claim 2, wherein said auxiliary charge storage means is connected to be responsive to storing a charge from the first polarity of the applied ac voltage.

4. An electronic protection circuit in accordance with claim 1, wherein the source voltage to the circuit to be protected and the applied ac voltage to the electronic protection circuit are the same.

5. An electronic protection circuit in accordance with claim 1, and including
    another charge storage means responsive to storing a charge from the second polarity of the applied ac voltage, and
    another gated semiconductor connected to said another charge storage means and to said photoswitch means such that when said another gated semiconductor is gated on, the charge stored on said another charge storage means is applied as an outgoing trigger.

6. An electronic protection circuit in accordance with claim 5, wherein said source voltage being sensed for a predetermined level is an ac voltage,
    said photoswitch means including
        a rectifier connected to the ac source voltage,
        a first phototransistor connected to said first named charge storage means and said first named gated semiconductor, and
        a second phototransistor connected to said another charge storage means and another gated semiconductor.

7. An electronic protection circuit in accordance with claim 5, wherein said source voltage being sensed for a predetermined level is a dc voltage,
    said photoswitch means including
        a first phototransistor connected to said first named charge storage means and said first named gated semiconductor, and
        a second phototransistor connected to said another charge storage means and another gated semiconductor.

8. In a dc power supply connected to an ac source voltage, including
    a rectifier having a two-line input to receive the ac source voltage,
    gated semiconductor means connected to the two-line input responsive to a positive or negative trigger to short together the two-line input of the power supply, and
    an overload cut out device responsive to open at least one of the two input lines when the lines are shorted together,
the improvement in a electronic protection circuit for providing a trigger to the power supply in the presence of a source voltage exceeding a predetermined amplitude, comprising
    charge storage means responsive to storing a charge from a first polarity of an applied ac voltage,
    photoswitch means responsive to said source voltage exceeding the predetermined level, and
    a gated semiconductor connected to said charge storage means and to said photoswitch means such that when said gated semiconductor is gated on, the charge stored on said charge storage means is applied as the outgoing trigger.

9. An electronic protection circuit in accordance with claim 8, and including
    another charge storage means responsive to storing a charge from the second polarity of the applied ac voltage,
    said photoswitch means being responsive to said source voltage exceeding the predetermined level in a first polarity for gating on said first named gated semiconductor and being responsive to said source voltage exceeding the predetermined level in a second polarity, and
    another gated semiconductor connected to said another charge storage means and to said photoswitch means such that when said another gated semiconductor is gated on by said photoswitch means in response to said source voltage exceeding the predetermined level in the second polarity, the charge stored on said another charge storage means is applied as an outgoing trigger of the opposite polarity from the first named trigger.

10. An electronic protection circuit in accordance with claim 9,
    said photoswitch means including
        a rectifier connected to the ac source voltage,
        a first phototransistor connected to said first named charge storage means and said first named gated semiconductor, and
        a second phototransistor connected to said another charge storage means and another gated semiconductor.

11. An electronic protection circuit in accordance with claim 10, and including second photoswitch means for sensing a dc voltage level,
    said second photoswitch means including
        a third phototransistor connected to said first named charge storage means and said first named gated semiconductor, and
        a fourth phototransistor connected to said another charge storage means and another gated semiconductor.

12. An electronic protection circuit in accordance with claim 8, and including
    an auxiliary charge storage means responsive to storing a charge, and
    a second gated semiconductor connected thereto and to said first named gated semiconductor, the output from said first named gated semiconductor gating on said second gated semiconductor so as to discharge said auxiliary charge storage means to add to the outgoing trigger.

13. An electronic protection circuit in accordance with claim 12, wherein said auxiliary charge storage means is connected to be responsive to storing a charge from the first polarity of the applied ac voltage.

14. An electronic protection circuit in accordance with claim 8, wherein the source voltage to the circuit to be protected and the applied ac voltage to the electronic protection circuit are the same.

* * * * *